UNITED STATES PATENT OFFICE 2,237,241

PREPARATION OF ETHERS

Charles J. Strosacker and Forrest C. Amstutz, Midland, Mich., assignors to The Dow Chemical Company, Midland, Mich., a corporation of Michigan No Drawing. Application May 19, 1939,
Serial No. 274,590

7 Claims. (Cl. 260—612)

This invention concerns an improved method of making ethers having the general formula:

$$(R-CH_2-)_2O$$

wherein R represents hydrogen or a monovalent aromatic radical.

In our co-pending application, Serial No. 247,678, filed December 24, 1938, of which this application is a continuation in part, we have disclosed that polyhydric alcohols and hydroxy-ethers are catalysts for the alkaline dehydrohalogenation of halogenated aliphatic or alicyclic compounds containing halogen and hydrogen atoms on adjacent carbon atoms, to form corresponding unsaturated compounds. For example, it is shown that such catalysts promote the reaction of sodium hydroxide with ethylene chloride to form vinyl chloride in accordance with the equation:

$$CH_2(Cl)CH_2Cl + NaOH \rightarrow CH_2=CHCl + NaCl + H_2O$$

We have now found that polyhydric alcohols and hydroxy-ethers derived therefrom also accelerate the formation of ethers by the reaction of alkalies with halogenated organic compounds having the general formula:

$$R-CH_2-X$$

wherein R represents hydrogen or a monovalent aromatic radical and X is a halogen. Such reaction for the formation of an ether is illustrated by the equation:

$$2R-CH_2-X + 2MOH \rightarrow R-CH_2-O-CH_2-R + 2MX + H_2O$$

wherein M represents a metal. In promoting this type of reaction, the polyhydric alcohol or its ether apparently serves as a reaction catalyst, since it need only be present in small proportion to be effective, but it may also have other functions in the reaction. For convenience, it will hereinafter be referred to as a catalyst.

Among the halogenated organic compounds which may be reacted to form corresponding ethers in accordance with the invention are methyl chloride, methyl bromide, methyl iodide, benzyl chloride, benzyl bromide, benzyl iodide, para-chloro-benzyl chloride, ortho-chloro-benzyl chloride, meta-chloro-benzyl chloride, ortho-para-dichloro-benzyl chloride, para-bromo-benzyl bromide, ortho-methyl-benzyl bromide, para-ethyl-benzyl chloride, meta-ethyl-benzyl chloride, para-isopropyl-benzyl bromide, ortho-methyl-para-chloro-benzyl chloride, etc. The requisite of the reactant is that it shall contain no hydroaliphatic carbon atom adjacent to that carrying the reactive halogen atom, since the presence of such adjacent hydrogen-bearing carbon atom results in production of an olefine rather than an ether as the main product.

Among the various polyhydric alcohols and hydroxy-ethers which may be used to promote the reaction are ethylene glycol, diethylene glycol, triethylene glycol, tetraethylene glycol, propylene glycol, dipropylene glycol, butylene glycol, glycerine, 1.3-dihydroxy-propane, 1.3-dihydroxy-butane, 1.4-dihydroxy-butane, beta-ethoxy-ethyl alcohol, beta-phenoxy-ethyl alcohol, beta-(2-chloro-phenoxy)-ethyl alcohol, beta-isopropoxy-ethyl alcohol, etc. Apparently any stable polyhydric alcohol or hydroxy-ether derived therefrom may be used for this purpose. The glycols are active catalysts, but hydroxy-ethers, e. g. polyglycols, are even more effective. Among the polyglycols, we have observed that the catalytic activity becomes greater as the number of glycol residues (and therefore ether groups) in the molecule is increased. For instance, diethylene glycol is a more active catalyst than ethylene glycol; triethylene glycol is more active than diethylene glycol; tetraethylene glycol is more active than triethylene glycol, etc.

Sodium hydroxide is preferably used as the alkaline reactant, but other alkalies capable of removing halogen from the organic reactant, e. g. potassium hydroxide, lithium hydroxide, etc., may be used instead.

The alkali and organic reactant may be used in any desired proportions, but the reaction occurs most smoothly when a molecular excess of the organic reactant is employed as a medium for the reaction. Usually from 1 to 5 moles and preferably between 2 and 4 moles of the organic reactant is employed per mole of the alkali. The catalyst may also be used in nearly any proportion, but for sake of economy it is usually employed in amount representing from 0.01 to 0.1 of the molecular equivalent of the alkali. The minimum proportion of catalyst required in order to obtain effective catalysis is dependent somewhat upon the particular reactants and catalyst employed, but in most instances 0.001 mole of catalyst per mole of alkali is sufficient to increase noticeably the rate of reaction.

In practicing the invention, a mixture of the reactants and catalyst is heated, when necessary, to obtain reaction. The reaction usually occurs smoothly at temperatures between 50° and 150° C., but it may sometimes be carried out at lower or higher temperatures. By using the more active of our catalysts, the reaction may in some instances be started at room temperature or only slightly above and be carried to completion without adding heat other than that generated by the reaction. The pressure at which the reaction should be carried out is dependent in part upon the boiling point of the organic reactant. For instance, the reaction of an alkali with methyl chloride (B. P. —23.7° C.) is carried out under pressure in a bomb or autoclave. On the other hand the reaction of an alkali with benzyl chloride to form dibenzyl ether may be carried out at atmospheric or increased pressure, as desired. Stirring of the mixture during the reaction is, of course, desirable.

The reaction is preferably carried out in the absence of diluents, but it may be carried out in the presence of a diluent, e. g. water or a monohydric alcohol such as methanol or ethanol, if desired. The benefits of the catalyst are obtained regardless of whether or not a diluent is present.

After completing the reaction, the ether product is separated in conventional manner, e. g. by distillation. In those instances in which the ether formed by the reaction possesses a boiling point below that of the organic reactant used in its preparation, the ether may be distilled from the mixture during the reaction.

The following examples illustrate certain ways in which the principle of the invention has been applied, but they are not to be construed as limiting the invention.

*Example 1*

A bomb was charged with 77 grams (1.92 moles) of substantially anhydrous flaked sodium hydroxide and 158 grams (3.14 moles) of methyl chloride. The charge was heated with agitation at a temperature of 100° C. for 8 hours. The bomb was then cooled and the organic products were distilled therefrom and condensed and collected in a trap cooled with an acetone-solid carbon dioxide mixture. The mixture of alkali and salt remaining in the bomb was analyzed, whereby it was found that only 57 per cent of the sodium hydroxide employed had been reacted. The organic distillate was analyzed and found to contain 80.5 per cent by weight of unreacted methyl chloride and 19.5 per cent of dimethyl ether.

*Example 2*

Example 1 describes the results obtained in an attempt to react sodium hydroxide with methyl chloride in the absence of catalysts. It was presented for purpose of comparison with this example, wherein the same reaction is carried out in the presence of one of the catalysts provided by the invention. The bomb employed in Example 1 was charged with 80 grams (2 moles) of flaked sodium hydroxide, 82 grams (1.65 moles) of methyl chloride, and 5 grams of triethylene glycol. The mixture was heated with agitation at a temperature of 100° C. for 8 hours, after which the organic product was distilled and the extent of the reaction was determined as in Example 1. Analysis of the residue from the distillation showed that 83.3 per cent of the sodium hydroxide employed had been consumed. The organic distillate was found to be practically pure dimethyl ether. It contained only 0.23 per cent by weight of unreacted methyl chloride.

*Example 3*

Two experiments on the production of dibenzyl ether were carried out under identical conditions, except that in one of the experiments a mixture of polyethylene glycols (largely diethylene glycol and triethylene glycol) was present as a reaction catalyst, whereas in the other experiment this catalyst was omitted. In the experiment using the catalyst, a mixture of 633 grams (5 moles) of benzyl chloride, 200 grams (5 moles) of flaked sodium hydroxide and 20 grams of the polyethylene glycols was heated with stirring under reflux at atmospheric pressure to a temperature of 160° C. for 16 hours. The organic products were then distilled from the mixture and the residual mixture of salt and alkali was analyzed to determine the extent of reaction. It was found that 73.3 per cent of the sodium hydroxide employed had been consumed. There were obtained 170 grams (1.34 moles) of unreacted benzyl chloride and 348 grams (1.76 moles) of dibenzyl ether. The yield of dibenzyl ether was 96 per cent of theoretical, based on the benzyl chloride consumed. In the experiment carried out in the absence of the polyethylene glycols, but under otherwise similar reaction conditions, only 24.4 per cent of the sodium hydroxide employed was reacted.

In the following claims, the expression "polyglycol," where employed, refers generically to poly-alkylene glycols, such as diethylene glycol, triethylene glycol, tetraethylene glycol, dipropylene glycol, tripropylene glycol, dibutylene glycol, etc.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method wherein an ether is prepared by reacting an alkali with a compound having the formula:

R—CH₂—X wherein R represents a member of the group consisting of hydrogen and mono-valent aromatic radicals and X represents a halogen, the step of carrying out the reaction in the presence of a catalytic amount of a compound selected from the class consisting of polyhydric alcohols and hydroxy-ethers.

2. In a method wherein an ether is prepared by reacting an alkali with a compound having the formula:

R—CH₂—X wherein R represents a member of the group consisting of hydrogen and mono-valent aromatic radicals and X represents a halogen, the step of carrying out the reaction in the presence of a hydroxy ether in amount not exceeding about 0.1 of the molecular equivalent of the alkali.

3. In a method wherein an ether is prepared by reacting an alkali with a compound having the formula

R—CH₂—X wherein R represents a member of the group consisting of hydrogen and mono-valent aromatic radicals and X represents a halogen, the step of carrying out the reaction in the presence of a polyhydric alcohol in amount not exceeding about 0.1 of the molecular equivalent of the alkali.

4. In a method wherein an ether is prepared by reacting an alkali metal hydroxide with a compound having the formula:

wherein R represents a member of the group consisting of hydrogen and mono-valent aromatic radicals, the step of carrying out the reaction in the presence of a catalytic amount of a compound selected from the class consisting of polyhydric alcohols and hydroxy ethers.

5. In a method wherein an ether is prepared by reacting an alkali with a compound having the formula:

wherein R represents a member of the group consisting of hydrogen and mono-valent aromatic radicals and X represents a halogen, the step of carrying out the reaction in the presence of a polyglycol in amount not exceeding about 0.1 of the molecular equivalent of the alkali.

6. In a method wherein dimethyl ether is prepared by reacting an alkali with methyl chloride, the step of carrying out the reaction in the presence of a compound selected from the class consisting of polyhydric alcohols and hydroxyethers, said compound being employed in amount not exceeding about 0.1 of the molecular equivalent of the alkali.

7. In a method wherein dibenzyl ether is prepared by reacting an alkali with benzyl chloride, the step of carrying out the reaction in the presence of a compound selected from the class consisting of polyhydric alcohols and hydroxyethers, said compound being employed in amount not exceeding about 0.1 of the molecular equivalent of the alkali.

CHARLES J. STROSACKER.
FORREST C. AMSTUTZ.